Patented Oct. 9, 1951

2,570,886

UNITED STATES PATENT OFFICE 2,570,886

7-CHLORO-6-ETHOXY-3-HEPTENOIC ACID NITRILE

Georges E. Tabet, Wilmington, Del., assignor to E. I. du Pont de Nemours and Company, Wilmington, Del., a corporation of Delaware No Drawing. Application March 25, 1950, Serial No. 151,989

1 Claim. (Cl. 260—465.6)

This invention relates to 7-chloro-6-ethoxy-3-heptenoic acid and the nitrile thereof.

An object of this invention is to prepare compounds of the formula $$ClCH_2CH(OC_2H_5)CH_2CH=CHCH_2-X$$

wherein X is a member of the class consisting of cyano and carboxyl groups.

It has been discovered in accordance with this invention that cyanation of butadiene-alpha,-beta-dichloro-ethyl ether adducts yields the nitrile of 7-chloro-6-ethoxy-3-heptenoic acid. The cyanation methods which may be employed include the recently disclosed processes for reacting allylic chlorides with hydrogen cyanide in the presence of cuprous chloride under mildly acidic conditions (cf. U. S. Patents 2,477,617, 2,477,672 and 2,477,674).

The butadiene-alpha,beta-dichloroethyl ether adducts which are employed in the practice of this invention are obtainable by the method of A. N. Pudovik (Izvest. Akad, Nauk. s. s. s. r. Otdel. Khim. Nauk. 529–35 (1948) No. 5, Sept.-Oct.). In carrying out the preparation of these adducts one thousand grams of alpha,beta-dichloroethyl ether, 832 grams of butadiene and 15 grams of fused zinc chloride were charged into a stainless steel one-gallon autoclave. The mixture was stirred for 48 hours while the temperature was maintained at 3° to 5° C. The product was discharged and the autoclave was washed with ether; the product and ether wash were combined and the mixture was washed well with water. This brownish mixture turned to a light yellow organic solution upon washing. The product was then washed with dilute sodium carbonate solution to remove traces of zinc compounds. The organic layer was dried over anhydrous calcium chloride and the solution, after drying, was filtered and distilled. After recovery of volatile solvents and small amounts of low boilers, a first fraction weighing 146.9 grams boiling at 71° to 80° C. at 3 mm. of mercury was collected; this consisted mainly of the 1,2-adduct of the formula, $$ClCH_2CH(OC_2H_5)CH_2ClCHCH=CH_2$$

A second fraction weighting 536.6 grams, boiling at 98° to 102° C. at 3 to 4 mm. of mercury, consisting mainly of the 1,4-adduct of the formula, $$ClCH_2CH(OC_2H_5)CH_2CH=CHCH_2Cl$$

The cyanation of the 1,2- and 1,4-adducts is illustrated in the following example.

Example.—A mixture of 39.5 grams of 1,6-dichloro-5-ethoxyhexane-2 (the 1,4-adduct described above), 20 grams of calcium carbonate, 100 cc. of water, 30 cc. of hydrogen cyanide and 2 grams of cuprous chloride catalyst was heated in a silver-lined shaker tube under autogenous pressure at 130° C. for two hours. The product was discharged, and the tube was washed with chloroform and water. The combined product and wash was filtered to remove calcium carbonate and cuprous chloride catalyst. The water layer was removed and the organic layer was dried with calcium chloride. The products from five such shaker tube runs were combined and distilled, yielding after recovery of the solvents, 165.8 grams of material boiling at 123°C./1 mm. Hg.($N_D^{26}$=1.4642); this material was found to have a chlorine analysis of 18.6, 18.9%, which agrees closely with the theoretical value of 18.9%; this material was the nitrile of 7-chloro-6-ethoxy-3-heptenoic acid. Precisely the same nitrile was obtained when the experiment was repeated using the 1,2-adduct (described above) in place of the 1,4-adduct. A mixture consisting of 40 grams of this nitrile and 260 cc. of 6 N hydrochloric acid was kept at room temperature for 16 hours, after which it was heated at reflux temperature for 5 hours. The hydrolysis product thus obtained was made alkaline by addition of aqueous sodium hydroxide and the alkaline mixture was extracted with ether to remove organic impurities. The solution of sodium salt was then acidified with dilute sulfuric acid and extracted with ether. The ether extract was distilled, yielding a fraction boiling at 130° to 131° C. at a pressure of 0.4 mm. of mercury ($N_D^{30}$=1.4692); this compound had a neutral equivalent of 207, which closely agrees with the theoretical value for 7-chloro-6-ethoxy-3-heptenoic acid.

The products obtained in the practice of this invention are valuable and useful as intermediates in the manufacture of difunctional compounds, including long chain dinitriles, long chain dicarboxylic acids, and long chain diamines such as ethoxy-octamethylene diamine. These latter compounds are in turn useful in the manufacture of polyamide and polyester resins.

I claim:

A compound of the formula $$ClCH_2CH(OC_2H_5)CH_2CH=CHCH_2CN$$

having a boiling point of 123° C. at a pressure of one mm. of mercury.

GEORGES E. TABET.

REFERENCES CITED

The following references are of record in the file of this patent:

Pudovik: Chem. Abstracts, vol. 43, col. 2158–2159 (1943).

Pudovik: Chem. Abstracts, vol. 43, col. 5737 (1943).